(12) United States Patent
Zhang et al.

(10) Patent No.: US 7,684,182 B2
(45) Date of Patent: Mar. 23, 2010

(54) FIXING APPARATUS FOR DATA STORAGE DEVICE

(75) Inventors: Guang-Yi Zhang, Shenzhen (CN); Xiao-Zheng Li, Shenzhen (CN); Jian Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 30 days.

(21) Appl. No.: 12/193,766

(22) Filed: Aug. 19, 2008

(65) Prior Publication Data
US 2009/0224115 A1 Sep. 10, 2009

(30) Foreign Application Priority Data
Feb. 21, 2008 (CN) .......................... 2008 1 0300371

(51) Int. Cl.
*G06F 1/16* (2006.01)

(52) U.S. Cl. ............................. 361/679.33; 360/264.2; 248/694; 16/258; 312/223.2

(58) Field of Classification Search ............ 361/679.33, 361/679.34, 679.31, 679.6; 248/316.1, 201, 248/213.2, 309.1, 354.3; 16/386, 258, 347; 360/244.3, 123.01, 245.1, 97.01; 211/26; 312/223.2, 223.3
See application file for complete search history.

(56) References Cited

U.S. PATENT DOCUMENTS

| 7,492,586 B2 * | 2/2009 | Peng et al. ............. 361/679.33 |
| 2009/0059509 A1 * | 3/2009 | Peng et al. ................. 361/685 |
| 2009/0101781 A1 * | 4/2009 | Peng et al. ............... 248/316.1 |
| 2009/0129009 A1 * | 5/2009 | Zhang et al. ........... 361/679.34 |

* cited by examiner

Primary Examiner—Huang V Duong
(74) Attorney, Agent, or Firm—Zhigang Ma

(57) ABSTRACT

A fixing apparatus for fixing a data storage device with a plurality of mounting holes defined in sidewalls thereof includes a first bracket, a second bracket, and a latch member. The first bracket includes a side sheet and a base sheet perpendicularly connected thereto. The second bracket includes a side sheet, and a base sheet perpendicularly connected thereto. The base sheet of the second bracket is pivotally attached to the base sheet of the first bracket. The latch member is slidably attached to the base sheet of the first bracket and engages with the base sheet of the second bracket. A plurality of fixing pins extends from the side sheets of the first bracket and the second bracket, corresponding to the mounting holes of the data storage device.

9 Claims, 5 Drawing Sheets

FIXING APPARATUS FOR DATA STORAGE DEVICE

BACKGROUND

1. Field of the Invention

The present invention relates to data storage, and specifically to a fixing apparatus for data storage devices providing convenient removal and installation.

2. Description of Related Art

An electronic apparatus, such as a typical desktop computer, tower computer, server, or the like, usually includes storage devices, such as hard disk drives, compact disk read-only memory (CD-ROM) drives, digital video disc (DVD) drives, floppy disk drives, and the like. These storage devices are typically added to increase the functionality of the electronic apparatuses. Conventionally, the storage devices with rigid cases are retained in enclosures by means of bolts or screws. However, attachment and detachment of screws or bolts is time-consuming and cumbersome.

What is needed, therefore, is a fixing apparatus which can provide convenient removal and installation of data storage devices.

SUMMARY

A fixing apparatus for a data storage device with a plurality of mounting holes defined in sidewalls thereof includes a first bracket, a second bracket, and a latch member. The first bracket includes a side sheet, and a base sheet perpendicularly connected to the side sheet. The second bracket includes a side sheet, and a base sheet perpendicularly connected to the side sheet. The base sheet of the second bracket is pivotally attached to the base sheet of the first bracket. The latch member is slidably attached to the base sheet of the first bracket and engages with the base sheet of the second bracket. A plurality of fixing pins extends from the side sheets of the first bracket and the second bracket, corresponding to the mounting holes of the data storage device.

Other objects, advantages and novel features of the present invention will become more apparent from the following detailed description when taken in conjunction with the accompanying drawings.

DETAILED DESCRIPTION

Figure 1:
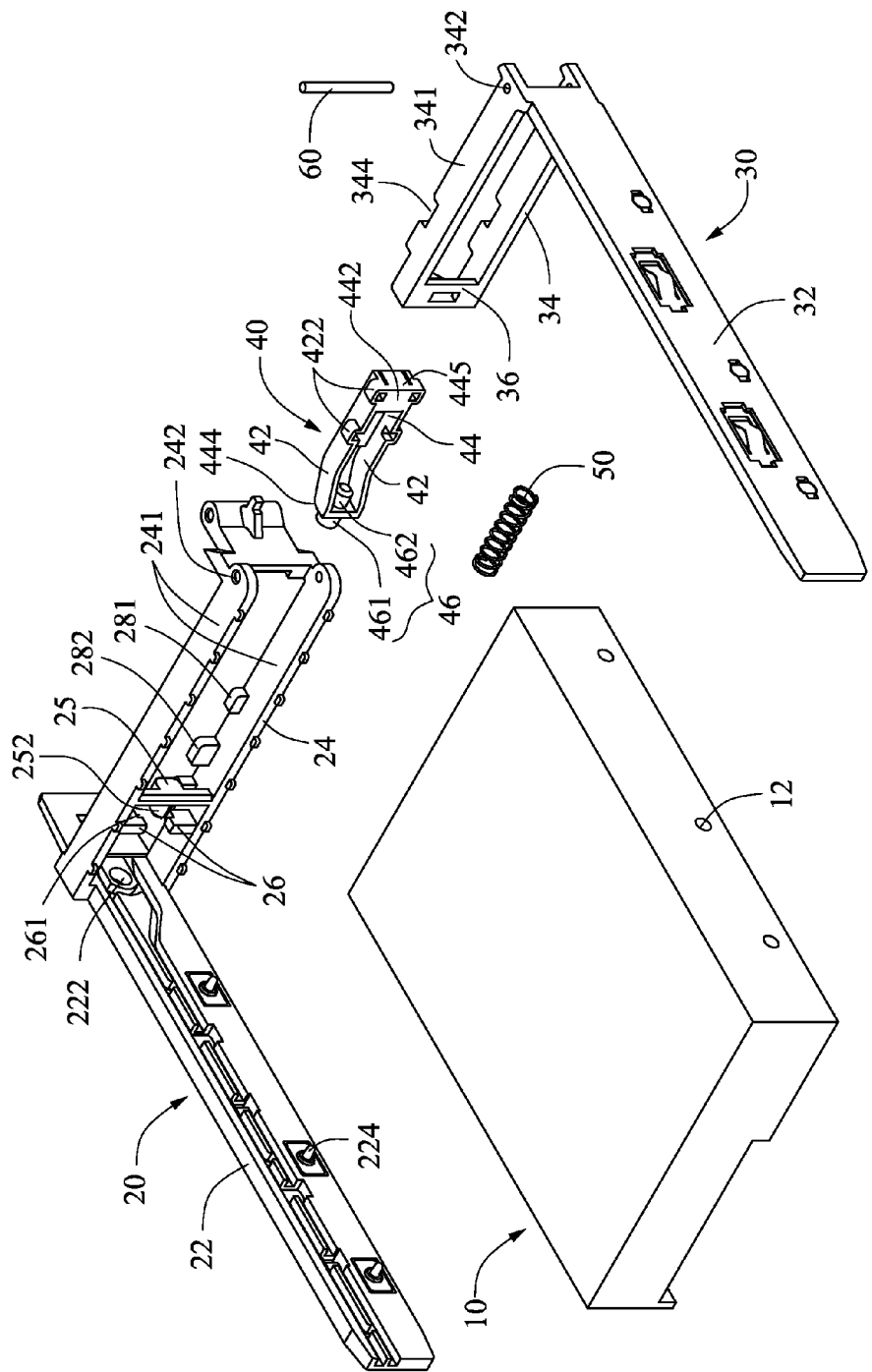
FIGS. 1 and 2 are exploded, isometric views of a fixing apparatus according to an embodiment of the present invention, with a data storage device, viewed from different aspects.

Referring to FIG. 1, a fixing apparatus in accordance with an embodiment of the present invention for fixing a data storage device 10 is shown. The fixing apparatus includes a first bracket 20, a second bracket 30, a latch member 40, a resilient member 50, and a shaft 60.

Sidewalls of the data storage device 10 define a plurality of mounting holes 12. The resilient member 50 is a coiled spring.

Figure 2:
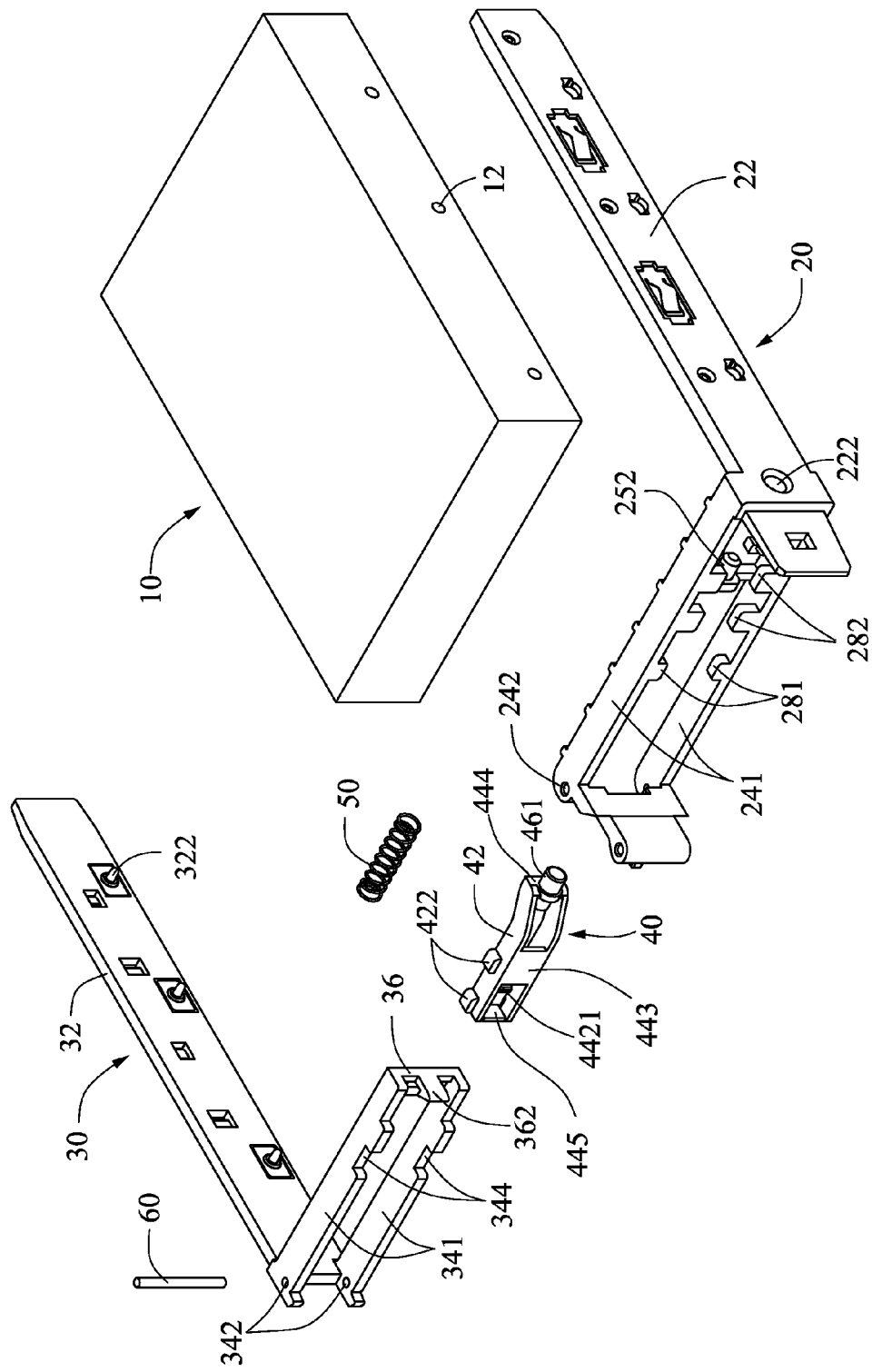

Referring also to FIG. 2, the first bracket 20 is L-shaped and includes a side sheet 22, and a base sheet 24 perpendicularly connected thereto. An end portion of the side sheet 22 beside the base sheet 24 defines a through hole 222. A plurality of fixing pins 224, facing the storage device 10, extends inward from an inner side of the side sheet 22. The base sheet 24 includes a pair of spaced and parallel side panels 241. A free end of the base sheet 24 defines a pair of first through pivot holes 242 in the side panels 241. The centers of each of the first pivot holes are aligned. A blocking member 25 is sandwiched between the side panels 241 and parallel to the side sheet 22. A post 252 extends from the blocking member 25 toward the side sheet 22. A pair of guiding blocks 26 extends toward each other from the side panels 241 correspondingly at an inner side of the inside edges of the side panels 241. A free end of each guiding block 26 defines an L-shaped cutout 261 in an outer corner (see FIGS. 1 and 5). Two pairs of first positioning blocks 282 extend toward each other from the side panels 241 correspondingly at an inner side of the outside edges of the side panels 241, respectively. A pair of second positioning blocks 281 extends toward each other from the side panels 241 correspondingly at an inner side of the outside edges thereof beside the first positioning blocks 281. The first positioning blocks 282 are higher than the second positioning blocks 282. The first positioning blocks 282 are also spaced from the second positioning blocks 282.

The second bracket 30 is L-shaped and includes a side sheet 32, and a base sheet 34 perpendicularly connected thereto. A plurality of fixing pins 322, facing the storage device 10, extends inward from an inner side of the side sheet 32. The base sheet 34 includes a pair of spaced and parallel side panels 341. Each of the side panels 341 defines a second pivot hole 342 beside the side sheet 32. Each side panel 341 defines a cutout 344 along an outside edge of the side panels 341. A connecting portion 36 is perpendicularly arranged between the end portions of the inner side of the side panels 341 away from the side sheet 32. A hook 362 extends perpendicularly and outwardly from the connecting portion 36.

The latch member 40 is a hollow shell with a curved configuration. The latch member 40 includes a pair of horizontal sidewalls 42 with curved configurations, a pair of vertical sidewalls 442, 443 perpendicularly disposed between the opposite side edges of the horizontal sidewalls 42, and a pair of vertical end walls 444, 445 perpendicularly disposed between the opposite end edges of the horizontal sidewalls 42. The horizontal sidewalls 42 include a pair of spaced locating blocks 422 extending outward therefrom along inside edges thereof, respectively. The end wall 444 includes a rod 46 extending therethrough. The rod 46 includes a first part 461 located outside of the latch member 40, and a second part 462 located inside of the latch member 40. The vertical sidewall 442 includes an opening 44 defined therein, and a catch 4421 extending therefrom besides the opening 44.

Figure 3:
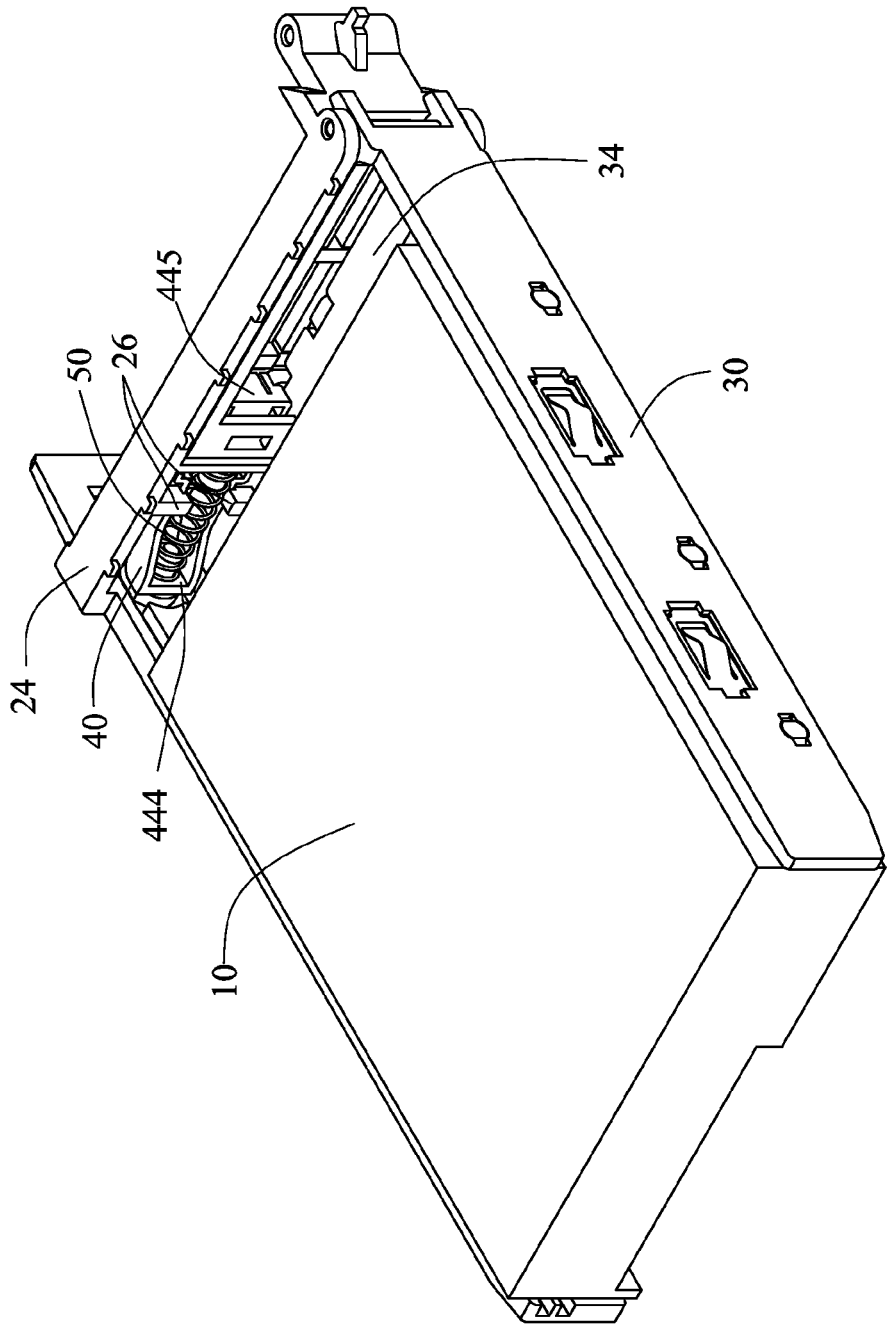
FIGS. 3 and 4 are assembled views of FIGS. 1 and 2, respectively, showing the fixing apparatus in a locked condition, viewed from different aspects.
Figure 4:
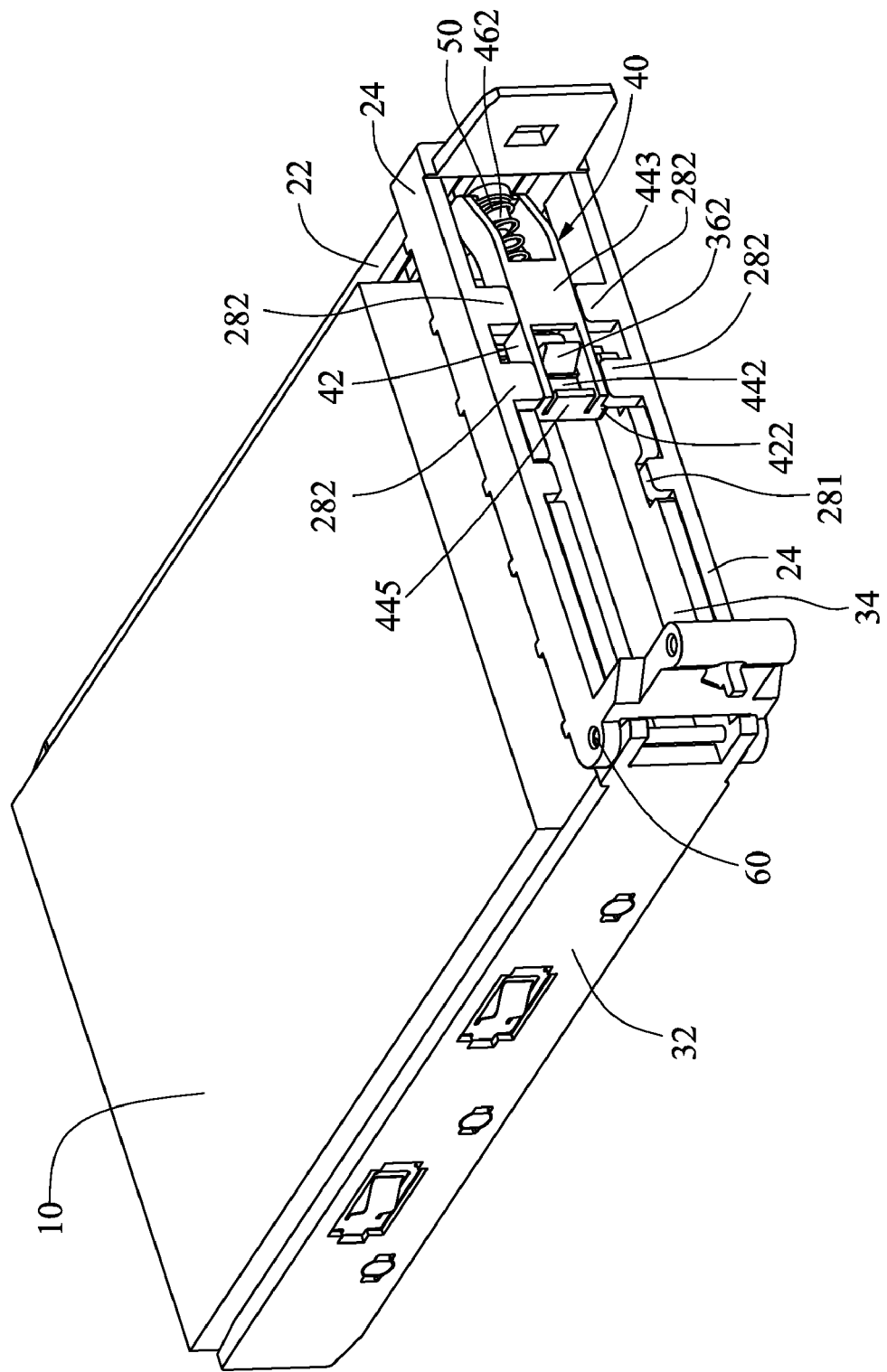
Figure 5:
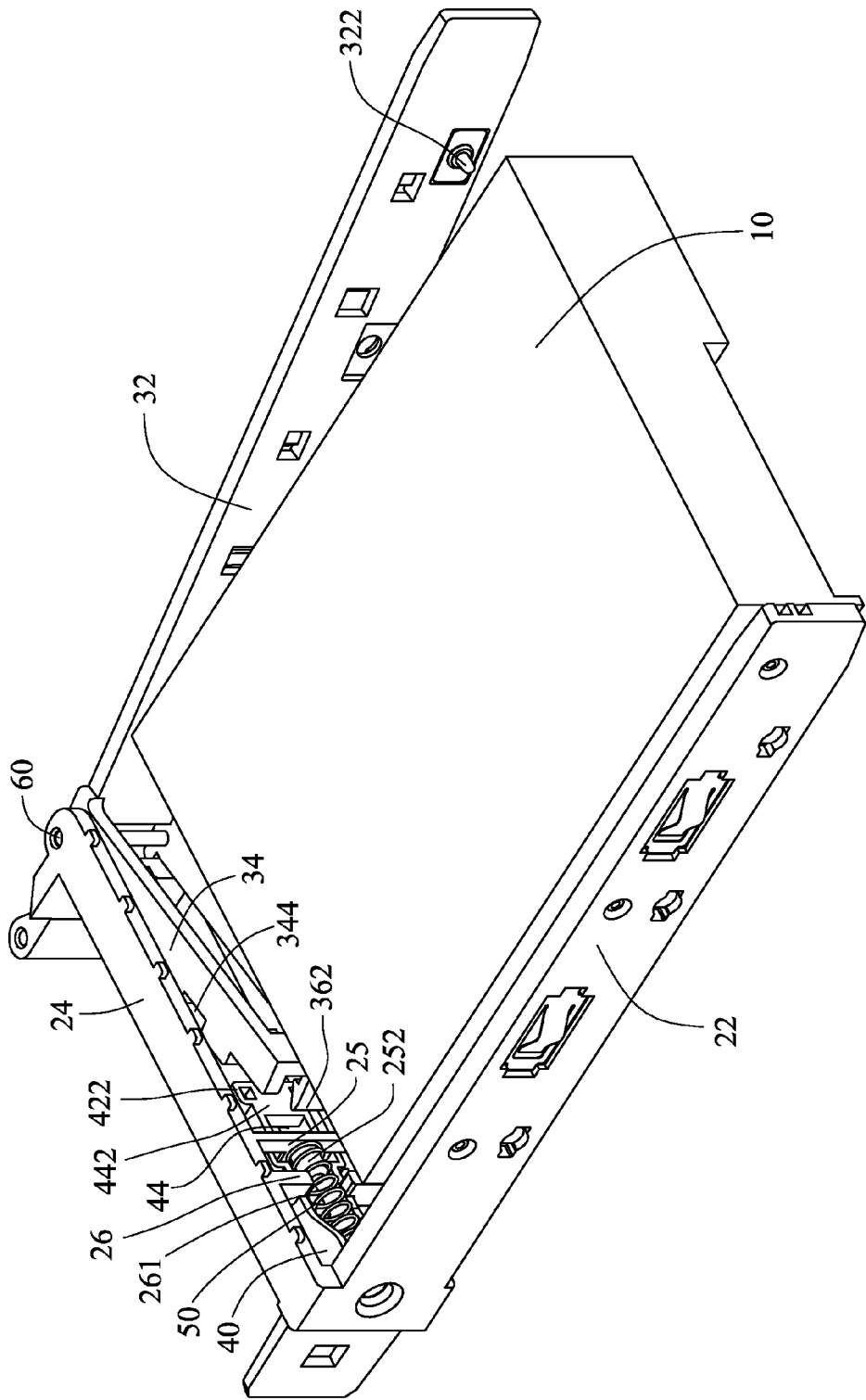
FIG. 5 is similar to FIGS. 3 and 4, but showing the fixing apparatus in a released condition.

Referring also to FIGS. 3 to 5, in assembly of the fixing apparatus, the latch member 40 is slidably attached to the first bracket 20, with the horizontal sidewalls 42 thereof slidably sandwiched between distal end surfaces of the first positioning blocks 282 of the first bracket 20 (shown in FIG. 4). The locating blocks 422 of the latch member 40 slidably contact inside surfaces of the first positioning blocks 282 of the first bracket 20 (shown in FIG. 4) and the L-shaped cutouts 261 of the guiding blocks 26 of the first bracket 20 slidably contact the inside edges of the horizontal sidewalls 42 of the latch member 40 correspondingly (shown in FIG. 5). Two end portions of the resilient member 50 are correspondingly fixed around the second part 462 of the rod 46 and the post 252 of the stop board 25 of the first bracket 20. The first part 461 of the rod 46 slidably extends into the through hole 222 of the first bracket 20. The second bracket 30 is pivotally attached to the first bracket 20, with the side panels 341 of the base sheet 34 sandwiched between the side panels 241 of the base sheet 24 and the shaft 60 extending through the first pivot holes 242 of the first bracket 20 and the second pivot holes 342 of the second bracket 30. The cutouts 344 of the side panels 341 of the second bracket 30 mate with the second positioning blocks 281 and the pair of first positioning blocks 282 (shown in FIG. 4). The hook 362 of the second bracket 30 extends into the opening 44 of the latch member 40 to detachably engage the catch 4421 of the latch member 40.

Referring also to FIGS. 4 and 5, to fix the data storage device 10, the first part 461 of the rod 46 of the latch member 40 is pushed inward by a pen or a pointed article to slidably move the latch member 40 towards the second bracket 30, thereby, depressing the resilient member 50. Therefore, the hook 362 of the second bracket 30 disengages from the catch 4421 of the latch member 40. The latch member 40 moves to an original position by a force form the resilient member 50. Then the base sheet 34 of second bracket 30 can be pivoted away from the base sheet 24 of the first bracket 20. The side sheet 32 of the second bracket 30 is pivoted away from the side sheet 22 of the first bracket 20. Thereafter, the data storage device 10 is placed between the first bracket 20 and second bracket 30, with the fixing pins 224 of the side sheet 22 of the first bracket 20 extending into the mounting holes 12 of one sidewall of the data storage device 10. Then the second bracket 30 is pivoted toward the data storage device 10 to let the fixing pins 322 of the side sheet 32 of the second bracket 30 extend into the mounting holes 12 of the other sidewall of the data storage device 10. At the same time, the hook 362 of the second bracket 30 extends into the opening 44 of the latch member 40 to engage the catch 4421 of the latch member 40.

To detach the data storage device 10, the first part 461 of sliding rod 46 of the latch member 40 is pushed inward to release the hook 362 of the second bracket 30 from the catch 442 of the latch member 40. Then the second bracket 30 is pivotally rotated away from the first bracket 20, with the fixing pins 322 thereof withdrawing from the data storage device 10. The data storage device 10 can then be easily moved away from the fixing apparatus.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A fixing apparatus for a data storage device with a plurality of mounting holes defined in sidewalls thereof, the fixing apparatus comprising:
   a first bracket comprising a side sheet, and a base sheet perpendicularly connected to the side sheet;
   a second bracket comprising a side sheet, and a base sheet perpendicularly connected to the side sheet, the base sheet of the second bracket pivotally attached to the base sheet of the first bracket;
   a latch member slidably attached to the base sheet of the first bracket and engaging with the base sheet of the second bracket; and
   a plurality of fixing pins respectively extending inward from an inner side of the side sheets of the first bracket and the second bracket, corresponding to the mounting holes of the data storage device.

2. The fixing apparatus as claimed in claim 1, wherein, the base sheet of the first bracket comprises a pair of spaced and parallel side panels;
   the base sheet of the second bracket comprises a pair of spaced and parallel side panels sandwiched between the side panels of the base sheet of the first bracket;
   the each pair of the side panels of the first bracket and second bracket define a pair of aligned pivot holes in end portions thereof away from the side sheets respectively; and
   the base sheet of the second bracket is pivotally attached to the base sheet of the first bracket by a shaft extending through the pivot holes of the first bracket and the second bracket.

3. The fixing apparatus as claimed in claim 2, wherein the latch member is a hollow shell with a curved configuration and comprises a rod located at one end thereof, the first bracket comprises a blocking member sandwiched between the spaced and parallel side panels thereof, the blocking member comprises a post extending therefrom, and a resilient member is fixed around the rod of the latch member and the post of the blocking member.

4. The fixing apparatus as claimed in claim 3, wherein a connecting portion is perpendicularly arranged between the side panels of the second bracket, and a hook extends perpendicularly and outward from the connecting portion, the latch member comprises an opening defined in sidewalls thereof, and a catch formed beside the opening, the hook extends into the opening to detachably engage the catch.

5. The fixing apparatus as claimed in claim 2, wherein, the first bracket further comprises a plurality of positioning blocks extending toward each other from the side panels, respectively;
   the latch member comprises a pair of parallel sidewalls slidably sandwiched between distal end surfaces of the positioning blocks.

6. The fixing apparatus as claimed in claim 5, wherein the latch member further comprises a pair of spaced locating blocks extending outward from the sidewalls thereof, and side surfaces of the positioning blocks of the first bracket slidably contact side surfaces of the locating blocks.

7. The fixing apparatus as claimed in claim 2, wherein the first bracket further comprises a pair of guiding blocks each with an L-shaped cutout extending toward each other from one of the side panels thereof to slidably engage side edges of the latch member.

8. The fixing apparatus as claimed in claim 2, wherein a plurality of positioning blocks extend toward each other from each of the side panels of the first bracket, a plurality of cutouts is defined in each of the side panels of the second bracket, the cutouts of the second bracket mate with the positioning blocks of first bracket.

9. The fixing apparatus as claimed in claim 1, wherein the side sheet of the first bracket defines a through hole, the latch member comprises a rod extending from one end thereof to slidably extend into the through hole of the first bracket.

* * * * *